United States Patent [19]

deVries

[11] 4,141,702
[45] Feb. 27, 1979

[54] CONDENSATION CLEANING OF EXHAUST GASES

[75] Inventor: Egbert deVries, Kettering, Ohio

[73] Assignee: QUAD Corporation, Highland Park, Ill.

[21] Appl. No.: 814,420

[22] Filed: Jul. 11, 1977

[51] Int. Cl.² .............................................. B01D 47/06
[52] U.S. Cl. .................................... 55/94; 55/257 HE
[58] Field of Search ....................... 55/84, 93, 94, 222, 55/257 R, 257 HE; 165/163

[56] References Cited

U.S. PATENT DOCUMENTS

| | | | |
|---|---|---|---|
| 1,049,014 | 12/1912 | Weir | 165/163 X |
| 1,051,051 | 1/1913 | Zeckendorf | 55/222 |
| 2,858,903 | 11/1958 | Goetz et al. | 55/94 X |
| 3,018,231 | 1/1962 | Valentine et al. | 55/222 X |
| 3,167,413 | 1/1965 | Kiekens et al. | 55/257 R X |
| 3,247,681 | 4/1966 | Hankison et al. | 165/163 X |
| 3,473,298 | 10/1969 | Berman | 55/257 HE X |
| 4,045,192 | 8/1977 | Eckstein et al. | 55/222 |
| 4,049,399 | 9/1977 | Teller | 55/94 X |

OTHER PUBLICATIONS

"The Unique Spiral Heat Exchanger", American Heat Reclaiming Corporation, 1972.
Calvert, "How to Choose a Particulate Scrubber", *Chemical Engineering*, pp. 54–68, Aug. 29, 1977.
Semrau, "Practical Process Design of Particulate Scrubbers", *Chemical Engineering*, pp. 87–91, Sep. 26, 1977.
Gilbert, "Trouble Shooting Wet Scrubbers", *Chemical Engineering*, pp. 140–144, Oct. 24, 1977.

Primary Examiner—Robert H. Spitzer
Attorney, Agent, or Firm—Fidelman, Wolffe & Waldron

[57] ABSTRACT

Exhaust gases, such as those produced by the incineration of municipal refuse, are cleaned by water scrubbing the gases in an open tower and thereafter further cooling the gases by heat exchange to condense water vapor and to trap and remove particulate material and other contaminants. Fouling and plugging of the heat exchanger during the condensation step is avoided by use of a spiral flow-cross flow type of heat exchange element.

9 Claims, 1 Drawing Figure

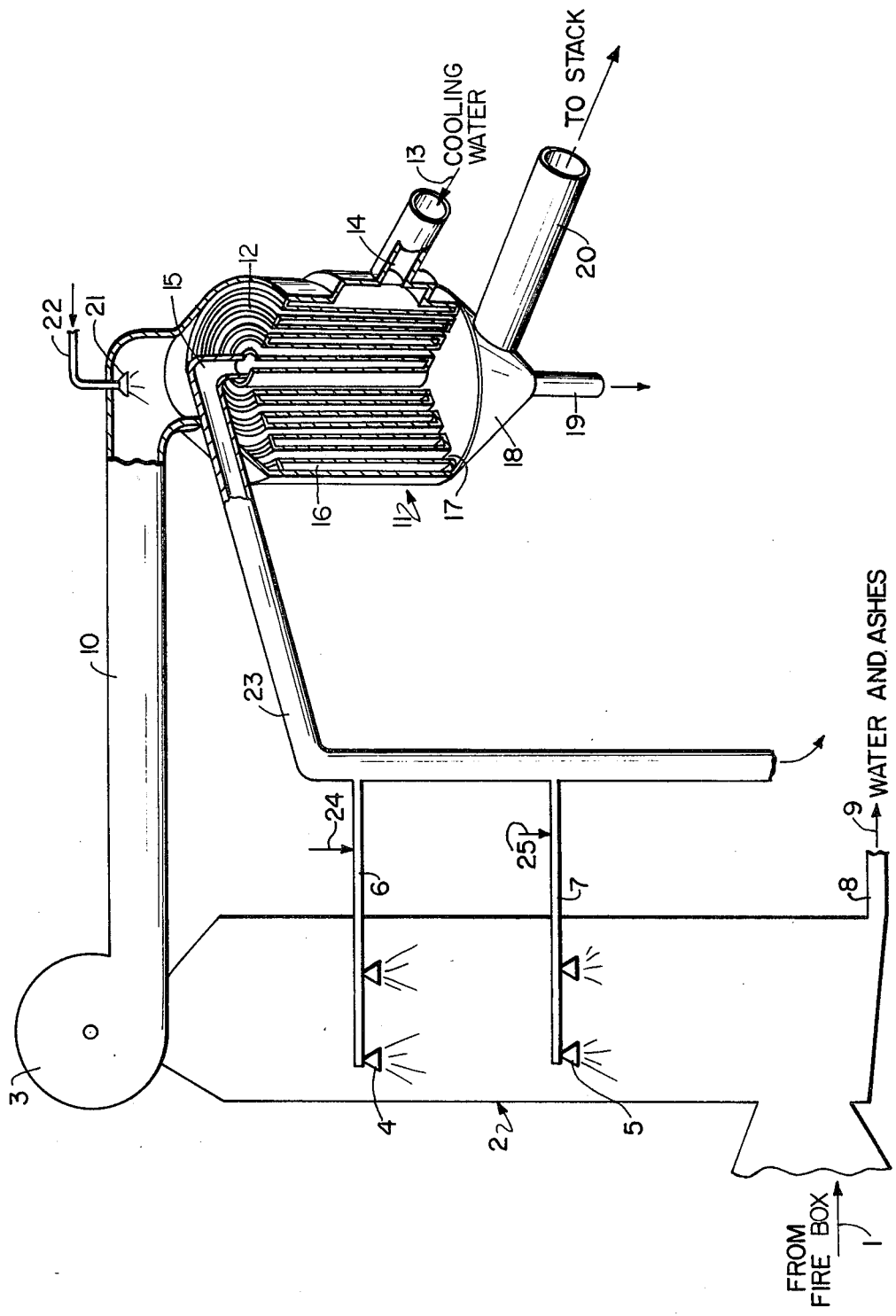

CONDENSATION CLEANING OF EXHAUST GASES

BACKGROUND OF THE INVENTION

Exhaust gases from combustion processes often carry substantial amount of solid and gaseous contaminants which must be removed before the gases are vented to the atmosphere. This problem is especially severe in the case of incinerators burning municipal trash and garbage. In addition to the usual solid and gaseous contaminants, incinerator exhaust gas often contains malodorous contaminants which intensify the problem.

It has been proposed to remove particulates from incinerator exhaust gases by means of electrostatic precipitators and indeed electrostatic precipitators have found use in the treatment of a large variety of particulate laden gas streams. Electrostatic precipitators are generally effective to remove particulate matter but cannot remove the usual gaseous contaminants.

A wide variety of wet scrubbers have been proposed, and used, for the removal of particulate matter and odorous components from waste gases. Venturi scrubbers, for example, utilize the energy of the gas stream to impact upon a liquid curtain causing atomization. Collisions between solid particles and liquid droplets tends to remove particulates from the gas and the liquid droplets can also absorb or otherwise react with certain components of the gas stream. While effective, venturi scrubbers require a relatively high pressure drop to function properly and thus are characterized by high operating costs.

It is also well known to treat odorous gases by contact with scrubbing liquids in packed towers of various types. This approach is effective to remove odorous materials but packed towers are inherently subject to fouling and plugging especially when the gas being treated carries particulate matter. Like venturi scrubbers, packed towers generally display a significant pressure drop and require a relatively high energy input to move the gas through the tower.

Yet another approach to the removal of solid particulates and noxious gases from exhaust gas streams is illustrated by U.S. Pat. No. 3,473,298. Exhaust gases are first contacted with a water spray which serves to cool the gases and remove at least the larger particulates. Thereafter, the exhaust gas stream is passed through a condenser which further cools the gas and causes condensation of water vapor. It has been found, however, that conventional tube-type heat exchangers quickly foul and plug in this service especially when treating dirty exhaust gas streams such as those produced by the burning of refuse in incinerators.

SUMMARY OF THE INVENTION

Hot, particulate-laden gases, such as incinerator exhaust gases, are first subjected to a water spray in an open scrubbing tower to cool the gases and to remove at least the larger sized particulate matter. Thereafter, the gas stream is passed downwardly through a spiral flow-cross flow heat exchanger wherein the gases are cooled by indirect contact heat exchange with a water stream. Condensation of water vapor upon cooling in the heat exchanger traps much of the remaining particulate matter which is then removed from the heat exchanger in the condensate stream. The parallel annular passages provided in the heat exchanger provide little resistance to gas flow and are continuously cleaned by condensate flowing down the heat exchange surfaces. Noxious and odorous gases are also removed by the water spray and condensation steps. Reactive chemicals may be added to the water spray to enhance the efficiency of contaminant gas removal.

Hence, it is an object of this invention to clean hot exhaust gases.

It is another object of this invention to remove contaminants including particulate matter, acid gases and odorous materials from exhaust gas streams.

A specific object of this invention is to clean gases produced by the burning of refuse in an incinerator.

Another specific object of this invention is to avoid fouling and plugging of heat exchangers used to cool particulate-laden exhaust gases.

BRIEF DESCRIPTION OF THE DRAWING

The FIGURE comprises a diagrammatic flow sheet of the process including a partial cross sectional view of the heat exchanger used to cool and condense components of the exhaust gas.

DETAILED DESCRIPTION OF THE INVENTION

The FIGURE illustrates a preferred embodiment of the invention used to treat the exhaust gases from an incinerator burning domestic refuse and trash. An exhaust gas stream 1 from the fire box of an incinerator is passed into the base of open scrubbing tower 2. By open tower is meant a tower without packing of other gas-liquid contacting elements. An induced draft fan 3 causes the gases to flow upwardly in the tower. Disposed at varying heights within tower 2 are a plurality of downwardly directed liquid nozzles 4 and 5.

Nozzles 4 and 5 are supplied with a liquid, preferably water, by means of conduits 6 and 7 respectively. The nozzles produce a relatively coarse water spray which functions to cool the gases and to strip a substantial amount of ash and other coarse particulates from the gas stream. Outlet port 8 is provided at the base of the tower through which an ash-carrying water stream 9 exits and is passed to waste. The water spray also acts to strip some of the water soluble, odorous and noxious gases from the exhaust gas stream.

After passing through the water spray, the exhaust gas stream is essentially saturated with respect to water vapor, carries some entrained water droplets and typically has a temperature on the order of 160° F. It has been conventional in the prior art to provide a demister or other entrained water separater immediately downstream of spray nozzles. In this invention, a demister is not only unneeded but is undesirable. Entrained water droplets tend to aid in washing the condenser surfaces as will later be explained. Additionally, a demister necessarily introduces a positive pressure drop into the system. Thus, elimination of the demister also reduces fan power costs.

From fan 3, the scrubbed exhaust gas is passed via conduit 10 to the top of a spiral flow-cross flow type of heat exchanger 11 which is oriented with the axis of the spiral heat exchange element 12 in a vertical direction. Cooling water 13 is introduced into the spiral element through entry port 14 and traverses a closed, spiral path to axially disposed exit means 15. Heat exchange element 12, shown in partial cross-section, consists of a continuous spiral defining a closed flow path 16 for water and an open annular flow path 17 for the exhaust gas. This arrangement provides an essentially unobstructed, channel-type gas passage which does not foul and plug as do conventional types of heat exchangers, such as shell and tube, used in the same service. Gas pressure drop through the heat exchanger is extremely low and a very high liquid velocity may be maintained in the closed spiral passage.

Exhaust gas from conduit 10 enters the heat exchanger at the top and is directed vertically downward. Contact with the relatively cold heat exchanger surfaces causes cooling of the water vapor-saturated gas with concomitant condensation onto those surfaces. Additional removal of particulate matter takes place during the condensation step as fine dust and ash particles are trapped by the condensing water droplets. Odorous contaminants of relatively high boiling point tend to condense out with the water and other gaseous contaminants are removed in solution in the condensed water vapor. Condensed water vapor forms a liquid film on the heat exchange surfaces and drains downwardly into a conical sump 18 at the bottom of the heat exchanger. Water carrying trapped particulate matter is removed from the heat exchanger by means of conduit 19 and is passed to waste. Cooled gas cleaned of its entrained particulate matter and reduced in moisture content exits from the bottom side of the heat exchanger via conduit 20 and is passed to a stack. Because of the abrupt change in direction of the gas flow as it leaves the heat exchanger to enter conduit 20, the gas flowing to the stack is essentially free of entrained water droplets.

It is sometimes advantageous or necessary to introduce an additional water spray into the heat exchanger over and above that entrained in the entering gas stream to adequately clean and flush the heat exchange surfaces. Such a condition will generally arise when the entering gas stream is heavily laden with particulate matter. This may be accomplished by providing a spray head 21 centrally located above the heat exchange element. Water is supplied to the spray head by means of conduit 22. The auxiliary water spray may be operated continuously or may be operated on an intermittant basis to flush the heat exchange surfaces.

Under typical operating conditions, as when cleaning an incinerator exhaust gas for example, the gas in conduit 10 will be cooled to a temperature below the boiling point of water or to about 150° to 180° F. As the gas passes through the heat exchanger, it is further cooled to a temperature usually within the range of about 110° to 140° F. and is approximately at the dew point as it exits the heat exchanger. Cooling water enters the heat exchanger at a temperature typically in the range of 70° to 90° F. and exits the heat exchanger at a temperature generally in the range of 130° to 150° F. It is to be appreciated that these operating parameters can be varied beyond the exemplary ranges set out above.

The relatively hot water stream exiting from the heat exchanger is transported through pipe 23 to points of further use. Part of the hot water stream may be used to supply spray nozzles 4 and 5 via conduits 6 and 7 as is illustrated in the drawing. All of the remaining portion of hot water may be used for domestic heating, industrial drying or similar purposes or may be passed through a cooling tower and recycled to the heat exchanger. When maximum recovery of heat from the hot water stream is desired, water may be supplied to spray nozzles 4 and 5 from an external source.

Depending upon the composition of the material being burned in an incinerator, there may be present in the exhaust gas an acid or other noxious gas such as sulfur dioxide. In such circumstances, it is advantageous to add a reactive chemical to the water stream supplied to spray heads or nozzles 4 and 5. This is most conveniently accomplished by introducing a relatively concentrated aqueous solution of the reactive chemical into the conduits supplying the spray heads. As is illustrated in the drawing, a chemical solution may be introduced into conduit 6 at 24 and into conduit 7 at 25. Introduction of the chemical may be accomplished by use of metering pumps as is well known in the art.

Choice of the reactive chemical is dependent upon the gaseous constituent present in the exhaust stream. For example, if sulfur dioxide is present in significant amount as is the case when rubber or rubber products such as tires are burned, then addition of an alkali such as sodium hydroxide significantly increases the removal of sulfur dioxide from the exhaust gas. In those cases where the refuse contains substantial amounts of garbage such as food wastes the exhaust gas often carries an offensive odor. Odor removal in the scrubbing tower can be exhanced by addition of an oxidizing chemical to the water supplying the spray nozzles. Suitable oxidizing chemicals include sodium hypochlorite, hydrogen peroxide and the like. Concentration of the oxidizing chemical in the water spray may typically range from about 100 to 300 ppm.

While this invention has been described in relation to its use for treating incinerator exhaust gases, its use is not limited thereto. Rather, the invention will find use for treating hot, particulate laden gases from other sources as well.

What is claimed is:

1. A process for the removal of solid and gaseous contaminants from a hot particulate-laden exhaust gas stream which comprises:

passing the gas stream upwardly through an open scrubbing tower;

subjecting the upwardly flowing gas stream to a downwardly directed water spray only of sufficient duration and amount to saturate the gas stream and to cool it to a temperature below the boiling point of water;

passing the saturated and cooled gas stream, now carrying entrained water droplets and fine particulate matter, directly to and downwardly through a spiral flow-cross flow heat exchanger having a heat exchange element oriented with its axis in a vertical direction, said heat exchange element defining a single closed, spiral liquid passage and an open, annular gas passage, said liquid and gas passages having vertically oriented and parallel boundaries;

maintaining said heat exchange element at a temperature substantially below the temperature of the incoming gas stream by passing a cooling liquid therethrough;

condensing water vapor contained in said gas stream on the heat exchange element surfaces, said condensation trapping and removing particulate matter and soluble and condensible gases contained in said gas stream;

removing a condensate stream carrying contaminants from the heat exchanger, and removing a cleaned gas stream from the heat exchanger at a point below the heat exchange element.

2. The process of claim 1 wherein said cooling liquid which is passed through the heat exchange element is water and wherein at least a portion of the water exiting from the heat exchange element is supplied to the water spray in said scrubbing tower.

3. The process of claim 1 wherein said exhaust gas stream is generated by the incineration of municipal refuse.

4. The process of claim 1 wherein said exhaust gas stream is cooled to a temperature in the range of 150° to 180° F. in said scrubbing tower.

5. The process of claim 4 wherein said gas stream is further cooled to a temperature in the range of 130° to 150° F. during its passage through said heat exchanger.

6. The process of claim 1 wherein a water spray is directed into the top of said heat exchanger.

7. The process of claim 1 wherein a reactive chemical is added to the water spray in said scrubbing tower.

8. The process of claim 7 wherein said reactive chemical is selected from the group consisting of alkalis and oxidizing chemicals.

9. The process of claim 1 wherein a motive force is supplied to said gas stream at a point between said scrubbing tower and heat exchanger.

* * * * *